US008729872B2

(12) United States Patent
Yu et al.

(10) Patent No.: US 8,729,872 B2
(45) Date of Patent: May 20, 2014

(54) MULTIPHASE CONTROL SYSTEM AND CONTROL UNIT

(75) Inventors: Chung-Che Yu, New Taipei (TW);
Li-Min Lee, New Taipei (TW);
Huan-Wen Chien, New Taipei (TW)

(73) Assignee: Green Solution Technology Co., Ltd., New Taipei (TW)

( * ) Notice: Subject to any disclaimer, the term of this patent is extended or adjusted under 35 U.S.C. 154(b) by 246 days.

(21) Appl. No.: 13/186,444

(22) Filed: Jul. 19, 2011

(65) Prior Publication Data
US 2012/0068674 A1 Mar. 22, 2012

(30) Foreign Application Priority Data
Sep. 21, 2010 (TW) ............................. 99131913 A

(51) Int. Cl.
G05F 1/00 (2006.01)
H02J 1/10 (2006.01)
(52) U.S. Cl.
USPC ........................................... 323/271; 363/65
(58) Field of Classification Search
USPC ............. 323/222–225, 271–274, 282–285; 363/65, 71, 72
See application file for complete search history.

(56) References Cited

U.S. PATENT DOCUMENTS

| 5,774,346 A * | 6/1998 | Poon et al. ...................... 363/17 |
| 6,628,106 B1 * | 9/2003 | Batarseh et al. ............... 323/222 |
| 6,784,644 B2 * | 8/2004 | Xu et al. ........................ 323/225 |
| 7,759,918 B2 * | 7/2010 | Moyer et al. ................... 323/272 |
| 2004/0095104 A1 * | 5/2004 | Brooks ........................... 323/272 |
| 2005/0001597 A1 * | 1/2005 | Walters et al. ................ 323/222 |
| 2005/0088156 A1 * | 4/2005 | Cheung et al. ................ 323/282 |
| 2006/0164050 A1 * | 7/2006 | Hasegawa et al. ............. 323/272 |
| 2007/0290664 A1 * | 12/2007 | Moyer et al. ................... 323/272 |
| 2007/0291520 A1 * | 12/2007 | Schuellein ....................... 363/65 |
| 2008/0018321 A1 * | 1/2008 | Clavette et al. ............... 323/316 |
| 2008/0169797 A1 * | 7/2008 | Zambetti et al. .............. 323/285 |
| 2009/0051334 A1 * | 2/2009 | Huang ........................... 323/247 |

FOREIGN PATENT DOCUMENTS

CN 101159413 4/2008

OTHER PUBLICATIONS

Office Action of China Counterpart Application, issued on Sep. 30, 2013, p. 1-p. 8.

* cited by examiner

*Primary Examiner* — Timothy J Dole
*Assistant Examiner* — Yusef Ahmed
(74) *Attorney, Agent, or Firm* — Jianq Chyun IP Office

(57) ABSTRACT

A multiphase control system is provided, which is adapted to convert power of an input power source into an output voltage for outputting through an output terminal. The multiphase control system comprises a plurality of control units connected in series to form a loop. Each of the control units receives a sequential input signal from an adjacent control unit connected there before through a multiphase input terminal, and generates a control signal to control power transmission from the input power source to the output terminal when determining that the output voltage is lower than a predetermined voltage value, and generates a sequential output signal at a multiphase output terminal for outputting to an adjacent control unit connected there after.

18 Claims, 4 Drawing Sheets

MULTIPHASE CONTROL SYSTEM AND CONTROL UNIT

CROSS-REFERENCE TO RELATED APPLICATION

This application claims the priority benefit of Taiwan application serial no. 99131913, filed on Sep. 21, 2010. The entirety of the above-mentioned patent application is hereby incorporated by reference herein and made a part of this specification.

BACKGROUND

1. Field of the Invention

The invention relates to a multiphase control system and a control unit. Particularly, the invention relates to a multiphase control system and a control unit, wherein the multiphase control system has a plurality of the control units connected in series and operated in a manner that a previous control unit is used to trigger a next control unit.

2. Description of Related Art

As driving voltages of today's electronic devices such as central processors and memories, etc. are gradually decreased, a tolerance range of voltage ripple is accordingly reduced. However, power consumption of the electronic device is not decreased by an equal magnitude, on the contrary, a current required for the operation is increased, and the relatively large current may cause relatively large voltage ripple. In order to resolve the above problem, a multiphase converting circuit structure is developed to separately provide the current through a plurality of converting circuits. Compared to a single-phase converting circuit structure, the multiphase converting circuit structure not only has a good performance in eliminating the voltage ripple, but also has advantages of fast transient response, low outputting ripple current and high heat dissipation, etc.

Referring to FIG. 1, FIG. 1 is a circuit schematic diagram illustrating a conventional direct current (DC)-DC converting circuit. The DC-DC converting circuit includes a controller 10 and three channels 12a-12c. Each of the channels 12a-12c includes two transistor switches connected in series between an input voltage Vin and ground. Drivers in the channels 12a-12c respectively receive pulse width modulation (PWM) signals PWM1-PWM3 from the controller 10 to switch the corresponding transistor switches, so as to provide channel currents Io1-Io3. The channel currents Io1-Io3 are combined to form an output current Io to charge a capacitor C so as to generate an output voltage Vout and accordingly drive a load Load. The controller 10 detects the channel currents Io1-Io3 through pin pairs CSP1 and CSN1, CSP2 and CSP2, and CSP3 and CSN3, and receives a feedback signal FB to adjust duty cycles of the transistor switches in the channels 12a-12c.

The controller 10 adjusts the channel currents Io1-Io3 according to detecting signals of the pin pairs CSP1 and CSN1, CSP2 and CSP2, and CSP3 and CSN3 to average the channel currents Io1-Io3 in order to close current ripples of the channels 12a-12c up. An averaging process of the above channel currents is implemented through sampling and holding the channel currents and computing of the current differences there between, so that circuit complexity and cost are relatively high. Moreover, operation timing of the channels 12a-12c are totally controlled by the controller 10, so that the number of the channels is determined according to a design specification of the controller 10 and cannot be increased or decreased to be fit for an actual application environment, which is lack of utilization flexibility.

SUMMARY OF THE INVENTION

In the related art, the circuit complexity and cost of the direct current (DC)-DC converting circuit are relatively high, and limited by a design specification of the controller used for multiphase control, the channel number cannot be adjusted according to different application environments. In the invention, by sequentially triggering control units in the channels, circuit complexity and cost are decreased, and the channel number can be adjusted by increasing/reducing the channels connected in series, which is flexible in utilization and the ripple is controlled within a predetermined range.

The invention provides a multiphase control system, which is adapted to convert power of an input power source into an output voltage for outputting through an output terminal. The multiphase control system comprises a plurality of control units connected in series to form a loop, where each of the control units receives a sequential input signal from an adjacent control unit connected there before through a multiphase input terminal, and generates a control signal to control the power transmission from the input power source to the output terminal when determining that the output voltage is lower than a predetermined voltage value, and generates a sequential output signal at a multiphase output terminal for outputting to an adjacent control unit connected there after.

The invention also provides a controller, which is applied in a multiphase control system for controlling a corresponding converting circuit to facilitate the multiphase control system providing a stable output voltage through a system output terminal. The controller includes a multiphase input circuit, a feedback control circuit and a multiphase output circuit. The multiphase input circuit generates a feedback control activating signal when receiving a sequential input signal. The feedback control circuit generates at least one control signal in response to the feedback control activating signal to control the corresponding converting circuit to transmit power to the system output terminal when the output voltage is lower than a predetermined voltage value. The multiphase output circuit generates a sequential output signal in response to the at least one control signal.

In order to make the aforementioned and other features and advantages of the invention comprehensible, several exemplary embodiments accompanied with figures are described in detail below.

It should be understood, however, that this Summary may not contain all of the aspects and exemplary embodiments of the invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
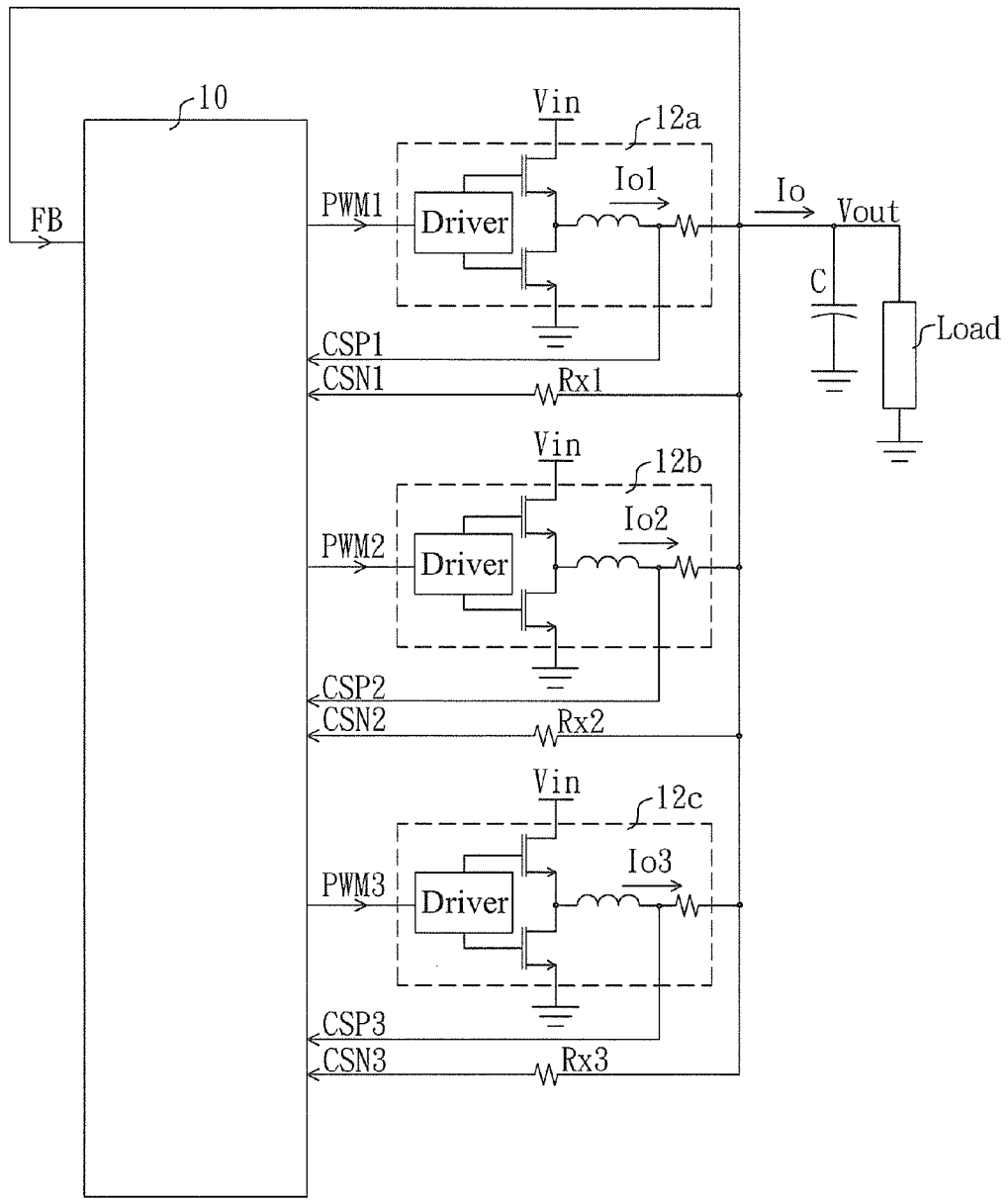
FIG. 1 is a circuit schematic diagram illustrating a conventional direct current (DC)-DC converting circuit.
Figure 2:
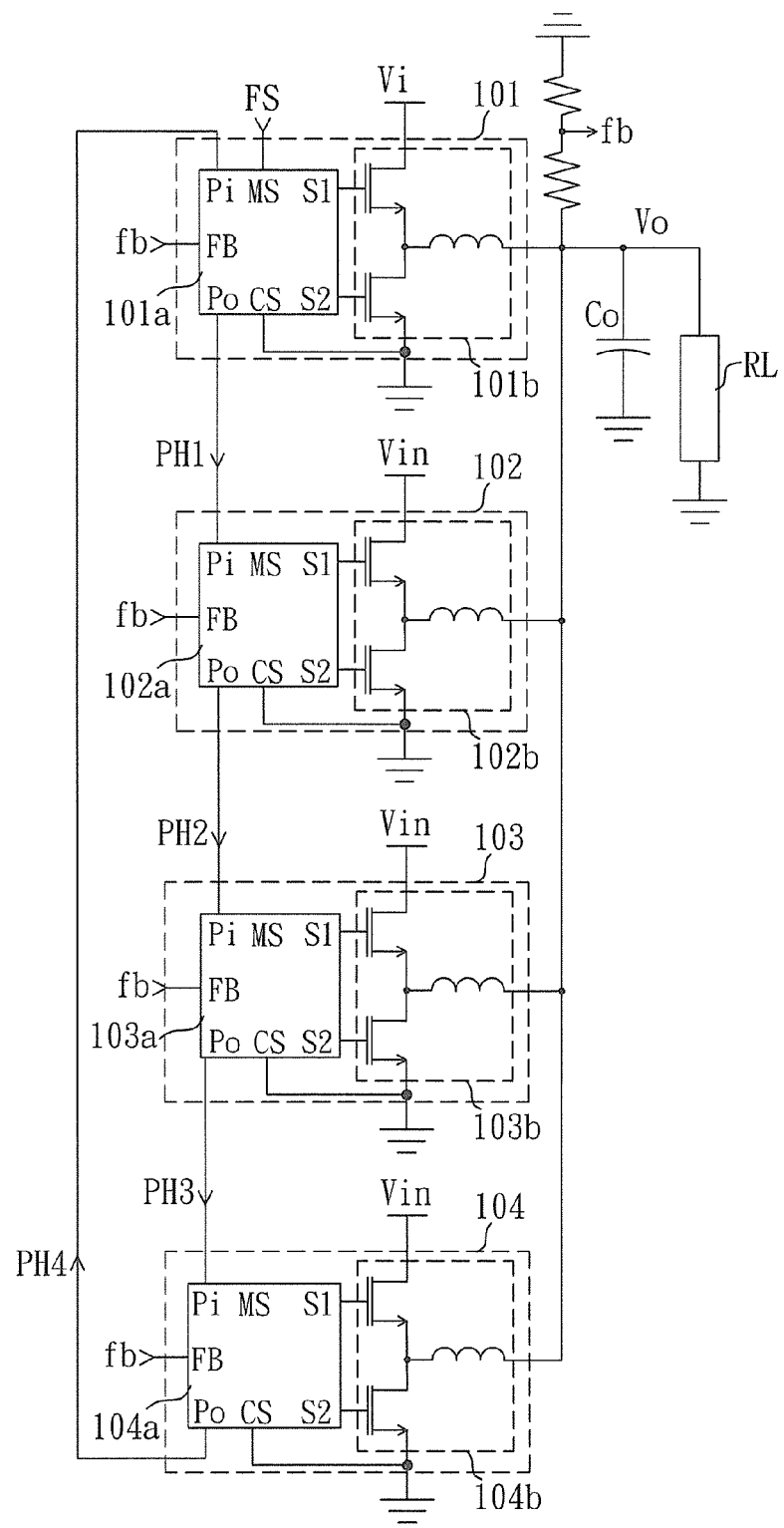
FIG. 2 is a circuit schematic diagram of a multiphase converting circuit according to an embodiment of the invention.

Referring to FIG. 2, FIG. 2 is a circuit schematic diagram of a multiphase converting circuit according to an embodiment of the invention. The multiphase converting circuit is used to convert power of an input power source Vi into an output voltage Vo for outputting through an output terminal, so as to provide power to a load RL. The multiphase converting circuit includes a plurality of channels, and in the present embodiment, four channels 101, 102, 103 and 104 are taken as an example, where the four channels are direct current (DC)-DC buck converting circuits. The channels 101-104 respectively include control units 101a-104a and converting circuits 101b-104b. The converting circuits 101b-104b are coupled to an output capacitor Co. The control units 101a-104a are used to generate control signals to control the corresponding converting circuits 101b-104b to transmit the power of the input power source Vi to the capacitor Co, so as to generate the stable output voltage Vo for driving the load RL.

The control units 101a-104a are connected in series to form a loop and to implement a multiphase control system of the multiphase converting circuit. In the present embodiment, each of the control units 101a-104a includes a multiphase input terminal Pi, a multiphase output terminal Po, a primary-secondary setting terminal MS, a feedback terminal FB, a current detection terminal CS and control terminals S1 and S2. Operations of the multiphase control system are described as follows.

The primary-secondary setting terminal MS of the first control unit 101a receives a primary control signal FS to set the first control unit 101a as a primary control unit. The primary control unit is a first control unit that operates to activate the multiphase control loop after the system is activated. Therefore, after the system is activated, the first control unit 101a determines whether the output voltage Vo is lower than a predetermined voltage value according to a feedback signal fb representing the output voltage Vo. When the output voltage Vo is lower than the predetermined voltage value, the first control unit 101a generates control signals at the control terminals S1 and S2 to control transistor switches in the converting circuit 101b to transmit the power of the input power source Vi to the output terminal for increasing the output voltage Vo, and meanwhile generates a first sequential signal PH1 at the multiphase output terminal Po to the second control unit 102a. The second control unit 102a receives the first sequential signal PH1 generated by the first control unit 101a through the multiphase input terminal Pi, and determines whether the output voltage Vo is lower than the predetermined voltage value according to the feedback signal fb. When the output voltage Vo is lower than the predetermined voltage value, the second control unit 102a generates control signals at the control terminals S1 and S2 to control transistor switches in the converting circuit 102b to transmit the power of the input power source Vi to the output terminal for increasing the output voltage Vo, and meanwhile generates a second sequential signal PH2 at the multiphase output terminal Po to the third control unit 103a. The third control unit 103a receives the second sequential signal PH2 generated by the second control unit 102a through the multiphase input terminal Pi, and determines whether the output voltage Vo is lower than the predetermined voltage value according to the feedback signal fb. When the output voltage Vo is lower than the predetermined voltage value, the third control unit 103a generates control signals at the control terminals S1 and S2 to control transistor switches in the converting circuit 103b to transmit the power of the input power source Vi to the output terminal for increasing the output voltage Vo, and meanwhile generates a third sequential signal PH3 at the multiphase output terminal Po to the fourth control unit 104a. The fourth control unit 104a receives the third sequential signal PH3 generated by the third control unit 103a through the multiphase input terminal Pi, and determines whether the output voltage Vo is lower than the predetermined voltage value according to the feedback signal fb. When the output voltage Vo is lower than the predetermined voltage value, the fourth control unit 104a generates control signals at the control terminals S1 and S2 to control transistor switches in the converting circuit 104b to transmit the power of the input power source Vi to the output terminal for increasing the output voltage Vo, and meanwhile generates a fourth sequential signal PH4 at the multiphase output terminal Po to the first control unit 101a. In this way, the multiphase control loop is formed to provide the stable output voltage Vo.

Figure 3:
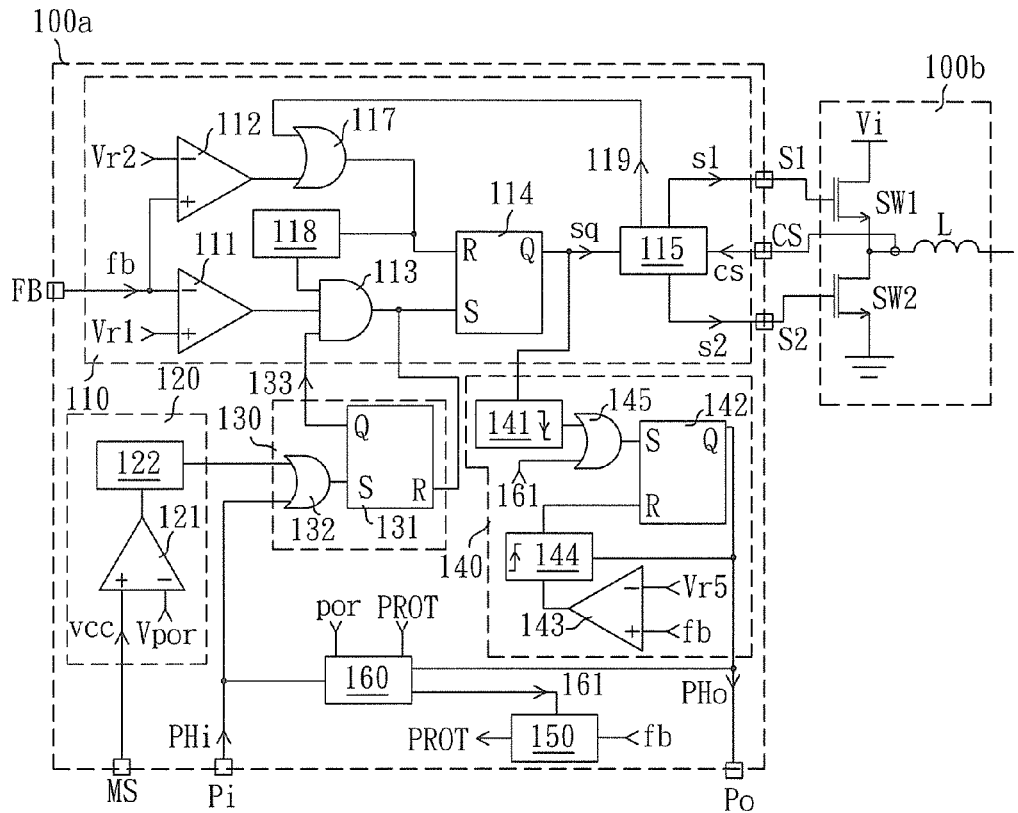
FIG. 3 is a circuit schematic diagram of a control unit according to a first embodiment of the invention.

Then, referring to FIG. 3, FIG. 3 is a circuit schematic diagram of a control unit according to a first embodiment of the invention. The control unit 100a of the embodiment is used to control a corresponding converting circuit 100b in a multiphase control system, so that the multiphase control system can provide a stable output voltage through a system output terminal. The control unit 100a includes a feedback control circuit 110, a primary control setting circuit 120, a multiphase input circuit 130, a multiphase output circuit 140, a protection circuit 150 and a bypass circuit 160. The primary control setting circuit 120 determines whether the control unit 100a serves as a primary control unit of the multiphase control loop through the primary-secondary setting terminal MS, and the primary control setting circuit 120 includes a comparator 121 and a one-shot circuit 122. In the present embodiment, the primary-secondary setting terminal MS is coupled to a driving voltage vcc of the control unit 100a to serve as a primary control signal, and now the comparator 121 determines that a potential of the primary-secondary setting terminal MS is higher than a primary-secondary reference potential Vpor, and generates a high level signal to drive the one-shot circuit 122 to generate a pulse signal. Now, the control unit 100a is set as the primary control unit. When the primary-secondary setting terminal MS is floating or coupled to the ground, the potential of the primary-secondary setting terminal MS is lower than the primary-secondary reference potential Vpor, and the control unit 100a is set as a secondary control unit.

The multiphase input circuit 130 includes an SR latch (flip-flop) 131 and an OR gate 132, and determines whether it is the control unit 100a's turn to perform feedback control according to a signal of the multiphase input terminal Pi. The OR gate 132 receives an output of the primary control setting circuit 120 and the signal of the multiphase input terminal Pi to generate a signal to a setting terminal S of the SR latch. When the setting terminal S of the SR latch is triggered, an output terminal Q outputs a feedback control activating signal 133 with a high level to the feedback control circuit 110 to activate the feedback control. Therefore, if the control unit 100a is set as the primary control unit, during an initial stage of system startup, the primary control setting circuit 120 of the control unit 100a triggers the multiphase input circuit 130 to generate the feedback control activating signal 133. If the control unit 100a is set as the secondary control unit, only when a sequential output signal of an adjacent control unit coupled there before is transmitted to the multiphase input terminal Pi to serve as a sequential input signal PHi, the multiphase input circuit 130 generates the high level signal 133.

The feedback control circuit 110 includes a first comparator 111, a second comparator 112, an AND gate 113, an SR latch 114, a driving circuit 115, an OR gate 117 and a minimum off time circuit 118, and which performs the feedback control according to the feedback control activating signal 133 and the feedback signal fb. An inverting terminal of the first comparator 111 is coupled to the feedback terminal FB for receiving the feedback signal fb, and a non-inverting terminal thereof receives a first voltage reference value Vr1. When the feedback signal fb is lower than the first voltage reference value Vr1, it represents that the output voltage Vo is lower than a first voltage value, and the first comparator 111 outputs a high level signal to the AND gate 113. The AND gate 113 is coupled to the multiphase input circuit 130 and the first comparator 111, and only when the output signals of the first comparator 111 and the multiphase input circuit 130 all have a high level, the AND gate 113 outputs a high level signal to trigger the SR latch 114 to output a high level turn-on control signal sq. The driving circuit 115 receives the high level turn-on control signal sq, and outputs a first control signal s1 through the control terminal S1 to turn on a first transistor switch SW1 in the converting circuit 100b, so that the power of the input power source Vi is transmitted to an output terminal (not shown) of the multiphase converting circuit through the first transistor switch SW1 and an inductor L, so as to increase the output voltage. The output of the AND gate 113 is also coupled to a reset terminal R of the SR latch 131 in the multiphase input circuit 130, so that while the SR latch 114 outputs the high level turn-on control signal sq, the SR latch 131 is reset to transit the feedback control activating signal 133 to a low level to wait for a next trigger of the sequential input signal PHi.

A non-inverting terminal of the second comparator 112 is coupled to the feedback terminal FB for receiving the feedback signal fb, and an inverting terminal thereof receives a second voltage reference value Vr2. When the output voltage Vo is increased to make the feedback signal fb to be higher than the second voltage reference value Vr2, it represents that the output voltage Vo is higher than a second voltage value, where the second voltage value is higher than the first voltage value. The second comparator 112 outputs a high level signal to the OR gate 117 to reset the SR latch 114, so as to transit the turn-on control signal sq to a low level. The driving circuit 115 receives the low level turn-on control signal sq, and outputs a second control signal s2 through the control terminal S2 to turn on a second transistor switch SW2 in the converting circuit 100b, and meanwhile turn off the first transistor switch SW1. Now, a current of the inductor L flows through the second transistor switch SW2. The driving circuit 115 also receives a current detection signal cs through the current detection terminal CS to determine whether the current of the inductor L is decreased to zero. If yes, the driving circuit 115 turns off the second transistor switch SW2 to avoid a reverse current.

Moreover, the driving circuit 115 also determines whether the current of the inductor L exceeds a predetermined maximum current value. If yes, the driving circuit 115 generates a current limiting signal 119 to the OR gate 117, and now the OR gate 117 outputs the high level signal to the reset terminal R of the SR latch 114 to reset the SR latch 114, so as to transit the turn-on control signal sq to the low level. Meanwhile, the driving circuit 115 stops turning on the first transistor switch SW1 and turns on the second transistor switch SW2. Current limiting of the inductor is intended to avoid an excessive inductor current (which is, for example, occurred during overload or the initial stage of the system startup) to cause magnetic saturation of the inductor L.

The minimum off time circuit 118 is coupled to an output terminal of the OR gate 117 and the AND gate 113. A default output of the minimum off time circuit 118 is a high level signal to the AND gate 113. Then, the minimum off time circuit 118 generates a low level signal for lasting a predetermined minimum off time length when receiving the high level signal output from the OR gate 117, and now the turn-on control signal sq is maintained to the low level for the minimum off time length, so that the inductor L has a time for releasing energy stored therein. In the multiphase control, the minimum off time circuit 118 is of no use in principle. However, the control unit 100a can serve as a signal phase feedback controller by connecting the multiphase input terminal Pi and the multiphase output terminal Po, and now configuration of the minimum off time circuit 118 may ensure that the inductor L has a time for releasing energy.

The multiphase output circuit 140 includes a falling edge triggered circuit 141, an SR latch 142, a comparator 143, a rising edge triggered circuit 144 and an OR gate 145, and which is used for outputting a sequential output signal PHo after the control unit 100a controls the converting circuit 100b to transmit the power to the output terminal. The falling edge triggered circuit 141 receives the turn-on control signal sq from the feedback control circuit 110, and when the turn-on control signal sq is transited from the high level to the low level, the falling edge triggered circuit 141 generates a high level signal to trigger the SR latch 142 through the OR gate 145, so that the SR latch 142 outputs the high level sequential output signal PHo through an output terminal Q to trigger an adjacent control unit coupled behind the control unit 100a to perform the feedback control. The high level sequential output signal PHo simultaneously activates the rising edge triggered circuit 144. When the control unit coupled behind the control unit 100a receives the sequential output signal PHo and detects that the output voltage Vo is lower than the first voltage value, it controls the corresponding converting circuit to transmit the power of the input power source Vi to the output terminal of the multiphase converting circuit to increase the output voltage Vo. A non-inverting terminal of the comparator 143 receives the feedback signal fb, and an inverting terminal thereof receives a fifth voltage reference value Vr5. When the control unit coupled behind the control unit 100a increases the output voltage Vo to exceed a fifth voltage value, the comparator 143 outputs a high level signal, where the fifth voltage value is higher than the first voltage value. Now, the rising edge triggered circuit 144 resets the SR latch 142 to transit the sequential output signal PHo to the low level, so that the control unit coupled behind the control unit 100a does not perform the feedback control when the output voltage Vo is again lower than the first voltage value, and a still next control unit performs the feedback control.

The protection circuit 150 receives the feedback signal fb to determine whether the output voltage Vo is excessively high or excessively low (for example, more than 125% of a predetermined voltage or less than 70% of the predetermined voltage), and if yes, the protection circuit 150 enters a protection mode and outputs a protection signal PROT to stop the operation of the control unit 100a and activate the bypass circuit 160.

The bypass circuit 160 is coupled to the multiphase output circuit 140, and when the control unit 100a cannot generate the control signal or is abnormal, the bypass circuit 160 transmits the sequential input signal PHi received by the multiphase input terminal Pi of the control unit 100a to the multiphase output terminal of the control unit 100a for outputting. The bypass circuit 160 receives a control unit normal signal por, wherein the control unit normal signal por may be generated in internal of the control unit 100a or may be input from outside. When the control unit 100a normally operates, the control unit normal signal por has a low level, and the bypass circuit 160 does not function. When the control unit normal signal por has a high level, it represents that the control unit 100a is in a bypass mode, and now the bypass circuit 160 is activated to output a bypass signal 161 to the protection circuit 150 and the multiphase output circuit 140. When the protection circuit 150 receives the bypass signal 161, it outputs the protection signal PROT to stop the feedback control of the control unit 100a. Alternatively, when the protection circuit 150 outputs the protection signal PROT, the bypass circuit 160 receives the protection signal PROT and activates the bypass mode, so as to avoid the influence caused by malfunction of the control unit 100a. When the OR gate 145 of the multiphase output circuit 140 receives the bypass signal 161, it triggers the SR latch 142 to output the high level sequential output signal PHo. Moreover, in order to avoid a situation that the multiphase output circuit 140 cannot normally operate when the control unit 100a is abnormal, the bypass circuit 160 can also directly output the sequential input signal PHi to the multiphase output terminal Po to serve as the sequential output signal PHo, and which can be implemented through a transistor, where a source and a drain of the transistor are respectively coupled to the multiphase input terminal Pi and the multiphase output terminal Po, and a gate of the transistor receives the control unit normal signal por.

Figure 4:
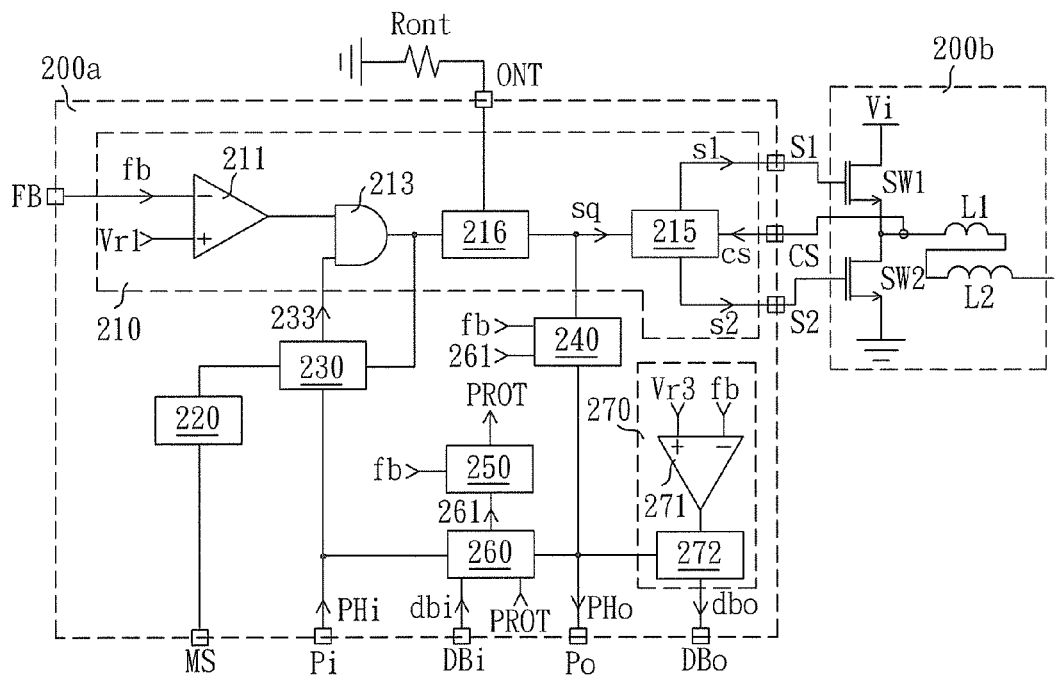
FIG. 4 is a circuit schematic diagram of a control unit according to a second embodiment of the invention.

Referring to FIG. 4, FIG. 4 is a circuit schematic diagram of a control unit according to a second embodiment of the invention. The control unit 200a includes a feedback control circuit 210, a primary control setting circuit 220, a multiphase input circuit 230, a multiphase output circuit 240, a protection circuit 250, a bypass circuit 260 and a succeeding bypass determination circuit 270, and which is used in a multiphase control system to control a corresponding converting circuit 200b. The primary control setting circuit 220, the multiphase input circuit 230, the multiphase output circuit 240 and the protection circuit 250 are similar to the primary control setting circuit 120, the multiphase input circuit 130, the multiphase output circuit 140 and the protection circuit 150 of FIG. 3, so that detailed descriptions thereof are not repeated.

In the present embodiment, the feedback control circuit 210 is a constant on time control circuit, and which includes a first comparator 211, an AND gate 213, a driving circuit 215 and a constant on time generating circuit 216. When the feedback signal fb is lower than the first voltage reference value Vr1, the first comparator 211 outputs a high level signal to the AND gate 213. Now, when the multiphase input circuit 230 also receives the sequential input signal PHi (which represents that it is the control unit 200a's turn to perform the feedback control) to generate a high level feedback control activating signal 233 to the AND gate 213, the AND gate 213 triggers the constant on time generating circuit 216 to generate a turn-on control signal sq with a constant time length. The constant on time generating circuit 216 determines the constant time length based on an on-time set resistor Ront coupled thereon through a terminal ONT. For example, the constant on time generating circuit 216 may determine a charge current based on a resistance of the on-time set resistor Ront to charge a capacitor so as to set the constant time length. In the invention, all control units in multiphase converting circuit could set the constant time length by the same on-time set resistor Ront to avoid power transmission unbalancing among the converting circuits and further users could adjust the constant time length according to the actual application condition and the number of channels. Of course, the constant time length could be set by other component, such as capacitor. Therefore, the driving circuit 215 turns on the first transistor switch SW1 for the constant time length, so that a time length for the converting circuit 200b transmitting the power of the input power source Vi to the output terminal of the multiphase converting circuit is fixed.

The succeeding bypass determination circuit 270 includes a comparator 271 and a succeeding bypass output circuit 272, and which is used for determining whether an adjacent control unit coupled behind the control unit 200a is capable of successfully performing the feedback control. The succeeding bypass output circuit 272 is coupled to the multiphase output circuit 240, and is activated when the sequential output signal PHo has the high level. An inverting terminal of the comparator 271 receives the feedback signal fb and a non-inverting terminal thereof receives a third voltage reference value Vr3, where the third voltage reference value Vr3 is lower than the first reference voltage value Vr1, for example, the third voltage reference value Vr3 is preferably set to 70% of the first voltage reference value Vr1. When the feedback signal fb is lower than the third voltage reference value Vr3, the comparator 271 outputs a high level signal to the succeeding bypass output circuit 272, and the succeeding bypass output circuit 272 accordingly outputs a succeeding bypass output signal dbo to a succeeding bypass input terminal of the adjacent control unit connected behind the control unit 200a through a succeeding bypass output terminal DBo of the control unit 200a. Namely, when the sequential output signal PHo is output, it represents that the adjacent control unit connected behind the control unit 200a has its turn to perform the feedback control, though the feedback control is not performed, and the output voltage Vo is decreased to the third voltage value, i.e. 70% of the first voltage value. The control unit 200a immediately sends the succeeding bypass output signal dbo to activate the bypass circuit in the control unit connected behind the control unit 200a to further transmit the sequential output signal PHo to a next control unit, and the next control unit performs the feedback control.

Compared to the embodiment of FIG. 3, the bypass circuit 260 additionally receives a succeeding bypass input signal dbi through a succeeding bypass input terminal DBi, i.e. a succeeding bypass input signal dbo generated by an adjacent control unit coupled before the control unit 200a. When the bypass circuit 260 receives the succeeding bypass input signal dbi, it represents that the control unit 200a has abnormity and the output voltage Vo is improperly decreased, and now the bypass circuit 260 is activated, and the control unit 200a outputs the sequential output signal PHo when receiving the sequential input signal PHi, so that the adjacent control unit coupled behind the control unit 200a bypasses the control unit 200a and directly performs the feedback control.

Moreover, it should be noticed that the inductor in the converting circuit 200b may include a plurality of inductors connected in series (in FIG. 4, the inductor includes an inductor L1 and an inductor L2 connected in series). Because saturation currents of the inductors are different, equivalent inductances thereof are also different under condition of flowing through with different currents, so that the converting circuit have higher conversion efficiency in case of a light load.

Figure 5:
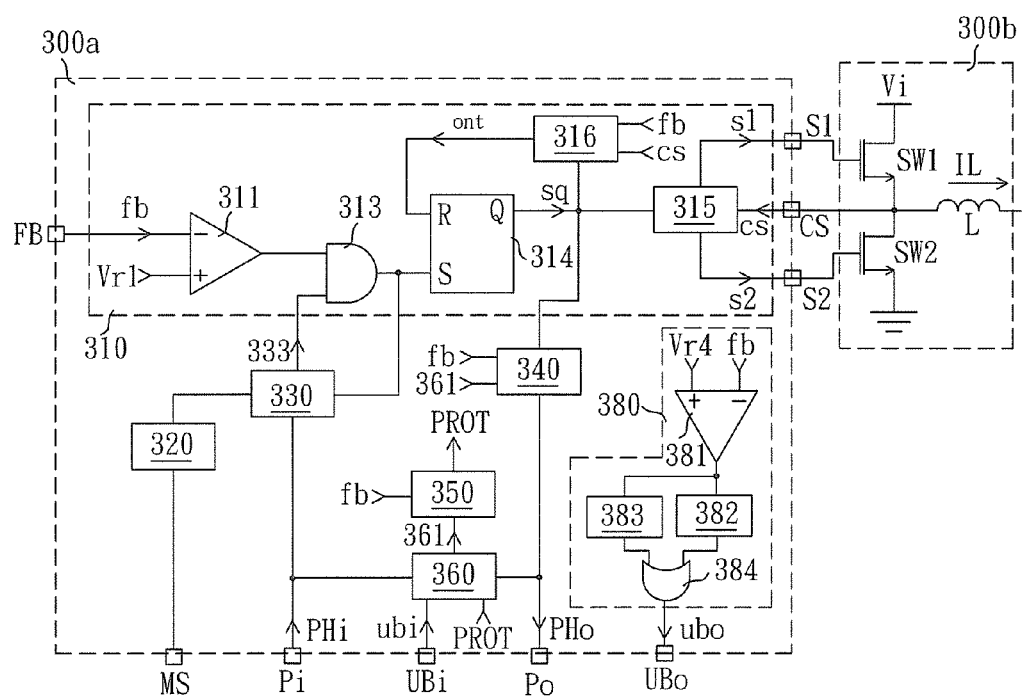
FIG. 5 is a circuit schematic diagram of a control unit according to a third embodiment of the invention.

Referring to FIG. 5, FIG. 5 is a circuit schematic diagram of a control unit according to a third embodiment of the invention. The control unit 300a includes a feedback control circuit 310, a primary control setting circuit 320, a multiphase input circuit 330, a multiphase output circuit 340, a protection circuit 350, a bypass circuit 360 and a preceding bypass determination circuit 380, and which is used in a multiphase control system to control a corresponding converting circuit 300b for outputting the power of the input power source Vi to the output terminal. The primary control setting circuit 320, the multiphase input circuit 330, the multiphase output circuit 340 and the protection circuit 350 are similar to the primary control setting circuit 120, the multiphase input circuit 130, the multiphase output circuit 140 and the protection circuit 150 of FIG. 3, so that detailed descriptions thereof are not repeated.

In the present embodiment, the feedback control circuit 310 is a constant on time control circuit, and which includes a first comparator 311, an AND gate 313, an SR latch 314, a driving circuit 315 and a quasi constant on time generating circuit 316. When the feedback signal fb is lower than the first voltage reference value Vr1, the first comparator 311 outputs a high level signal to the AND gate 313. Now, when the multiphase input circuit 330 also receives the sequential input signal PHi (which represents that it is the control unit 300a's turn to perform the feedback control) to generate a high level feedback control activating signal 333 to the AND gate 313, the AND gate 313 triggers the SR latch 314 to generate a turn-on control signal sq. Therefore, the driving circuit 315 turns on the first transistor switch SW1. The quasi constant on time generating circuit 316 receives the turn-on control signal sq, the feedback signal fb and the current detection signal cs, and starts to count a time length when receiving the turn-on control signal sq, where the time length is determined according to the feedback signal fb. After receiving the turn-on control signal sq and after the above time length is passed, the quasi constant on time generating circuit 316 generates an on time signal ont to reset the SR latch 314, so as to transit the turn-on control signal sq to the low level, and the driving circuit 315 turns off the first transistor switch SW1 and turns on the second transistor switch SW2, so that a current IL of the inductor L flows through the second transistor switch SW2. After receiving the turn-on control signal sq and before the above time length is passed, when the quasi constant on time generating circuit 316 determines that the current IL reaches a predetermined current upper limit according to the current detection signal cs, it immediately outputs the on time signal ont to reset the SR latch 314. Moreover, the driving current 315 also receives the current detection signal cs to determine a magnitude of the current IL, and turns off the second transistor switch SW2 to wait for a next cycle operation when the current IL is zero.

In the present embodiment, the converting circuit is a DC-DC buck converting circuit, and in a stable state, a relationship between a ratio of an output voltage and an input voltage and a duty cycle of the converting circuit is VO/VI=D=Ton/(Ton+Toff), where VO is the output voltage, VI is the input voltage, D is the duty cycle, Ton is a turn-on time, and Toff is turn-off time.

Since the feedback voltage fb is proportional to the output voltage VO, when the turn-on time Ton is proportional to the feedback voltage fb and when VI is the input voltage and VO is a fixed value, (Ton+Toff) is a fixed value, i.e. a frequency is a fixed value. Under a negative feedback control, the feedback voltage fb is stabilized around the first voltage reference value Vr1, so that the turn-on time Ton proportional to the feedback voltage fb can also be regarded as a fixed value to achieve a purpose of constant on time.

The preceding bypass determination circuit 380 includes a comparator 381, a preceding bypass output circuit 382, a counter 383 and an OR gate 384, and which is used for determining whether an adjacent control unit coupled before the control unit 300a is capable of successfully performing the feedback control. An inverting terminal of the comparator 381 receives the feedback signal fb and a non-inverting terminal thereof receives a fourth voltage reference value Vr4, where the fourth voltage reference value Vr4 is lower than the first reference voltage value Vr1, for example, the fourth voltage reference value Vr4 is preferably set to 70% of the first voltage reference value Vr1. When the feedback signal fb is lower than the fourth voltage reference value Vr4, the comparator 381 outputs a high level signal to the preceding bypass output circuit 382, and the preceding bypass output circuit 382 accordingly outputs a high level signal, and the OR gate 384 outputs a preceding bypass output signal ubo to a preceding bypass input terminal of the adjacent control unit connected before the control unit 300a through a preceding bypass output terminal UBo of the control unit 300a. Namely, when the output voltage Vo is decreased to the fourth voltage value, i.e. 70% of the first voltage value, the control unit 300a immediately sends the preceding bypass output signal ubo to activate the bypass circuit in the control unit connected before the control unit 300a. If the control unit connected before the control unit 300a receives the sequential input signal PHi, it represents that the control unit does not normally operate which lead to an excessively low output voltage, and by activating the bypass circuit of the control unit, the sequential input signal PHi is directly transmitted to the control unit 300a, and the control unit 300a performs the feedback control.

In summary, in the invention, by configuring the first voltage reference value Vr1 and the second voltage reference value Vr2 or configuring the (quasi) constant on time, a ripple range of the output voltage Vo is controlled within a certain range. Moreover, based on the multiphase control system connected as a loop and a tandem triggering manner of the adjacent control units, a phase number of the multiphase control system can be adjusted according to an actual design requirement, which avails simplifying circuit complexity and reducing the circuit cost, and providing a better utilization flexibility. Regarding a situation that any one of the control units connected in series as a loop fails to function, or the multiphase converting circuit cannot operate, the bypass circuit is used to bypass the malfunctioned control unit to ensure a normal operation of the circuit.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A multiphase control system, adapted to convert power of an input power source into an output voltage for outputting through an output terminal, the multiphase control system comprising:

a plurality of control units, connected in series to form a loop, wherein each of the control units determines that whether the output voltage is lower than a first voltage value, each of the control unit generates a control signal to transmit power from the input power source to the output terminal and a sequential output signal at a multiphase output terminal for outputting to an adjacent control unit connected there after when determining that the output voltage is lower than the first voltage value after receiving a sequential input signal from an adjacent control unit connected there before through a multiphase input terminal, each of the control units comprises a bypass circuit making the multiphase output terminal output the sequential output signal when the control unit receives the sequential input signal and the bypass circuit is activated, wherein when each of the control units generates the sequential output signal and determines that the output voltage is lower than a third voltage value, the control unit generates a succeeding bypass output signal to activate the bypass circuit of the adjacent control unit connected there after, where the third voltage value is lower than the first voltage value, or when each of the control units detects that the output voltage is lower than a fourth voltage, the control unit generates a preceding bypass output signal to activate the bypass circuit of the adjacent control unit connected there before, where the fourth voltage value is lower than the first voltage value.

2. The multiphase control system as claimed in claim 1, wherein each of the control units is a constant on time control unit that controls the power transmission for a constant duration during each cycle.

3. The multiphase control system as claimed in claim 2, wherein each of the control units determines the constant duration based on a same component.

4. The multiphase control system as claimed in claim 1, wherein each of the control units stops the power transmission when the output voltage is higher than a second voltage value, wherein the second voltage value is higher than the first voltage value.

5. The multiphase control system as claimed in claim 1, wherein each of the
bypass circuit transmits the sequential input signal received by the multiphase input terminal of the control unit to the multiphase output terminal of the control unit for outputting when the control unit is unable to generate the control signal.

6. The multiphase control system as claimed in claim 1, wherein one of the control units is set as a primary control unit for first generating the control signal and the sequential output signal when the multiphase control system is activated.

7. The multiphase control system as claimed in claim 1, wherein each of the control units determines a duty cycle of the generated control signal according to a level of the output voltage and a voltage level of the input power source.

8. The multiphase control system as claimed in claim 1, wherein when each of the control unit detects that the output voltage is higher than a fifth voltage value twice after generating the sequential output signal, the control unit stops generating the sequential output signal, wherein the fifth voltage value is higher than the first voltage value.

9. A control unit, applied in a multiphase converting circuit for controlling a corresponding converting circuit to facilitate the multiphase converting circuit providing a stable output voltage through a system output terminal, the control unit comprising:
a multiphase input circuit, generating a feedback control activating signal when receiving a sequential input signal;

a feedback control circuit, generating at least one control signal in response to the feedback control activating signal to control the corresponding converting circuit to transmit power to the system output terminal when the feedback control circuit determines that the output voltage is lower than a first voltage value; and a multiphase output circuit, generating a sequential output signal in response to the at least one control signal, wherein the control unit further comprises a succeeding bypass determination circuit, when the multiphase output circuit generates the sequential output signal and the succeeding bypass determination circuit determines that the output voltage is lower than a third voltage value, the succeeding bypass determination circuit generates a succeeding bypass output signal, where the third voltage value is lower than the first voltage value, or the control unit further comprises a preceding bypass determination circuit, when the output voltage is lower than a fourth voltage value, the preceding bypass determination circuit generates a preceding bypass output signal, where the fourth voltage value is lower than the first voltage value.

10. The control unit as claimed in claim 9, wherein the at least one control signal is a constant on time signal that controls the corresponding converting circuit to transmit the power to the system output terminal for a constant duration during each cycle.

11. The control unit as claimed in claim 10, wherein the control unit determines the constant duration based on a resistor or a capacitor.

12. The control unit as claimed in claim 9, wherein the feedback control circuit determines a duty cycle of the at least one control signal according to the output voltage.

13. The control unit as claimed in claim 9, wherein the feedback control circuit stops generating the at least one control signal when the output voltage is higher than a second voltage value, wherein the second voltage value is higher than the first voltage value.

14. The control unit as claimed in claim 9, further comprising a primary control setting circuit for generating the feedback control activating signal when receiving a primary control signal.

15. The control unit as claimed in claim 9, further comprising a bypass circuit, wherein the control unit generates the sequential output signal when the bypass circuit receives the succeeding bypass input signal and detects the sequential input signal.

16. The control unit as claimed in claim 9, further comprising a bypass circuit, wherein the control unit generates the sequential output signal when the bypass circuit receives the preceding bypass input signal and detects the sequential input signal.

17. The control unit as claimed in claim 9, wherein after the multiphase output circuit generates the sequential output signal, and detects that the output voltage is higher than a fifth voltage value, the multiphase output circuit stops generating the sequential output signal, wherein the fifth voltage value is higher than the first voltage value.

18. The control unit as claimed in claim 9, wherein the corresponding converting circuit controlled by the control unit comprises a plurality of inductors connected in series.

* * * * *